(12) United States Patent
Schlipf et al.

(10) Patent No.: US 12,509,214 B2
(45) Date of Patent: Dec. 30, 2025

(54) WING FOR AN AIRCRAFT

(71) Applicant: Airbus Operations GmbH, Hamburg (DE)

(72) Inventors: Bernhard Schlipf, Hamburg (DE); Oliver Seack, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/742,607

(22) Filed: Jun. 13, 2024

(65) Prior Publication Data
US 2024/0417062 A1    Dec. 19, 2024

(30) Foreign Application Priority Data

Jun. 14, 2023  (EP) .................................... 23179084

(51) Int. Cl.
*B64C 9/02*  (2006.01)
*B64C 7/00*  (2006.01)

(52) U.S. Cl.
CPC . *B64C 9/02* (2013.01); *B64C 7/00* (2013.01)

(58) Field of Classification Search
CPC .... B64C 9/02; B64C 7/00; B64C 9/08; B64C 9/24; B64C 3/50; B64C 3/38; B64C 3/54
See application file for complete search history.

(56) References Cited

U.S. PATENT DOCUMENTS

| | | | |
|---|---|---|---|
| 2,938,680 A * | 5/1960 | Greene ..................... | B64C 9/24 244/210 |
| 4,687,162 A | 8/1987 | Johnson et al. | |
| 2011/0038576 A1 | 2/2011 | Thornton et al. | |
| 2019/0176959 A1 * | 6/2019 | Poloni ..................... | B64D 15/04 |
| 2020/0122819 A1 | 4/2020 | Schlipf et al. | |
| 2020/0277039 A1 * | 9/2020 | Bensmann .............. | B64C 3/185 |
| 2020/0307768 A1 * | 10/2020 | Mino ........................ | B64C 9/02 |
| 2020/0307771 A1 * | 10/2020 | Dos Santos Borges .. | B64C 9/02 |
| 2020/0377195 A1 * | 12/2020 | Dovey .................... | B64C 9/323 |
| 2021/0024198 A1 * | 1/2021 | Lorenz ...................... | B64C 9/02 |
| 2021/0300523 A1 * | 9/2021 | Krey ........................ | B64C 9/22 |
| 2022/0081102 A1 * | 3/2022 | Tsai ........................ | B64C 13/32 |
| 2023/0391444 A1 * | 12/2023 | Schlipf .................... | B64C 9/22 |

FOREIGN PATENT DOCUMENTS

| | | | | |
|---|---|---|---|---|
| CA | 3048431 A1 * | 1/2021 | ............. | B64C 3/48 |
| EP | 3378760 A1 * | 9/2018 | ............. | B64C 13/34 |

OTHER PUBLICATIONS

Search Report for EP23179084, dated Nov. 23, 2023, 8 pages.

* cited by examiner

*Primary Examiner* — Assres H Woldemaryam
(74) *Attorney, Agent, or Firm* — Nixon & Vanderhye P.C.

(57) ABSTRACT

A high lift assembly (7) including: a high lift body with a high lift structure (8) and an internal volume (22), and a connection assembly (10) extending through an aperture (18) in an outer skin (20) of a leading edge of a main wing (5), the connection assembly (10) includes an elongate track (16) and a first and second connectors (12, 14), the elongate track (16) is mounted to the main wing (5) and moves along a track longitudinal axis (24), and the first and second connectors (12, 14) connect the elongate track (16), the first connector (12) is between the internal volume (22) and the outer skin (20), the second connector (14) has a longitudinal axis transverse to the leading edge of the high lift body and connects to the high lift body and the high lift structure has an opening (40) for the elongate track.

18 Claims, 5 Drawing Sheets

WING FOR AN AIRCRAFT

RELATED APPLICATION

This application incorporates by reference and claims priority to European Patent Application EP 23179084.1, filed Jun. 14, 2023.

TECHNICAL FIELD

The present invention relates to a wing for an aircraft. Further aspects of the invention relate to a high lift assembly for such a wing and a method for connecting a high lift body to a connection assembly, as well as an aircraft itself.

BACKGROUND AND SUMMARY OF DISCLOSURE

Aircraft wings, such as those of commercial aircraft, use high lift devices to increase wing area and wing camber to increase lift during take-off and landing. Typically, high lift devices are located at the leading and trailing edges of the wing, with a slat being an example of a commonly used high lift device, which may be termed as a high lift body, as above. High lift devices are often supported by elongate tracks, which may be curved and connected to the high lift device at an interface, for example by rib knuckles, bolts and links.

In existing designs, the interface including the rib knuckles, bolts and links requires a large cut-out region in the skin of the main wing, in particular to the skin of the fixed leading edge. Such a large cut-out enables the high lift body to be moved to a fully retracted position relative to the main wing, but when the high lift body is in an extended position also provides a relatively large opening through which rain and dirt may enter the main wing and come into contact with the components therein, and may also be the source of a large amount of noise. Some existing designs are known in which a relatively smaller cut-out is needed in the skin of the main wing by positioning the interface inside a portion of the high lift body, but in such designs the complexity is increased such that an access opening is required in the leading edge skin of the high lift body. Thus, another opening is formed through which dirt and water may enter, and which may create noise and additional drag during flight, and as such the problem is not solved.

SUMMARY OF DISCLOSURE

An aspect of the invention relates to a wing for an aircraft. The wing comprises a main wing and a high lift assembly. The main wing comprises a fixed leading edge having an outer skin, and the high lift assembly comprises a high lift body and a connection assembly.

An aspect of the invention relates to a wing for an aircraft. The wing comprises a main wing and a high lift assembly. The main wing comprises a fixed leading edge having an outer skin, and the high lift assembly comprises a high lift body and a connection assembly.

The high lift body may be or comprise, for example, a slat, a Krueger flap a droop nose/a leading-edge droop flap, or the like, and the high lift body additionally comprises a high lift structure comprising or defining an internal volume. The high lift structure may comprise, for example, an outer skin and one or more spars, e.g. front and rear spars of the high lift body. The internal volume may be an enclosed volume.

The connection assembly extends through an aperture in the outer skin of the fixed leading edge of the main wing so as to movably connect the high lift body to the main wing, such that the high lift body is movable between a retracted position and at least one extended position (e.g. a fully extended and a partially extended position). The connection assembly further comprises an elongate track and a first and second connector, where the elongate track is mounted to the wing via a bearing such that the track is moveable along a track longitudinal axis, and the first and second connectors connect the elongate track to the high lift body at a first end of the elongate track. The bearing may be any appropriate bearing, such as a roller bearing.

The high lift body is configurable, e.g. configured, to the retracted position such that the first connector is located between the internal volume in the high lift body and the outer skin of the main wing. The second connector is an elongate connector having a longitudinal axis oriented transverse to the leading edge of the high lift body, and is connected to the high lift body so as to permit translational movement between the high lift body and the connector along the longitudinal axis thereof. The high lift structure comprises an opening through which the elongate track extends such that the second connector is located in the internal volume of the high lift body.

As stated above, the longitudinal axis of the second connector may be oriented transverse to the leading edge of the high lift body, for example nonparallel to the leading edge of the high lift body. The orientation of the longitudinal axis may be in the flight direction, transverse to the span direction, perpendicular to the leading edge of the high lift body, or the like.

The high lift body may be or comprise, for example, a slat, a Krueger flap a droop nose/a leading-edge droop flap, or the like, and the high lift body additionally comprises a high lift structure comprising or defining an internal volume. The high lift structure may comprise, for example, an outer skin and one or more spars, e.g. front and rear spars of the high lift body. The internal volume may be an enclosed volume.

The connection assembly extends through an aperture in the outer skin of the fixed leading edge of the main wing so as to movably connect the high lift body to the main wing, such that the high lift body is movable between a retracted position and at least one extended position (e.g. a fully extended and a partially extended position). The connection assembly further comprises an elongate track and a first and second connector, where the elongate track is mounted to the wing via a bearing such that the track is moveable along a track longitudinal axis, and the first and second connectors connect the elongate track to the high lift body at a first end of the elongate track. The bearing may be any appropriate bearing, such as a roller bearing.

The high lift body is configurable, e.g. configured, to the retracted position such that the first connector is located between the internal volume in the high lift body and the outer skin of the main wing. The second connector is an elongate connector having a longitudinal axis oriented transverse to the leading edge of the high lift body, and is connected to the high lift body so as to permit translational movement between the high lift body and the connector along the longitudinal axis thereof. The high lift structure comprises an opening through which the elongate track extends such that the second connector is located in the internal volume of the high lift body.

As stated above, the longitudinal axis of the second connector may be oriented transverse to the leading edge of the high lift body, for example nonparallel to the leading edge of the high lift body. The orientation of the longitudinal axis may be in the flight direction, transverse to the span direction, perpendicular to the leading edge of the high lift body, or the like.

The present invention may be embodied to provide a connection assembly and high lift body having a simple design that reduces the area of any openings required in the main wing. The high lift body may be configurable to the retracted position such that the first connector is located between the internal volume in the high lift body and the outer skin of the main wing, while the second connector has a longitudinal axis oriented both transverse to the leading edge of the high lift body and which may intersect the track longitudinal axis, and is connected to the high lift body so as to permit translational movement between the high lift body and the connector along the longitudinal axis. Additionally, the high lift structure comprises an opening through which the elongate track extends such that the second connector is located in the internal volume of the high lift body. Thus, the first and second connectors are, in the retracted position, located outside of the main wing, and the second connector is simply connected to the high lift body so as to enable translational movement therebetween. Thus, the main wing may comprise a smaller aperture in the outer skin thereof, while no extra or additional aperture is needed in the skin of the high lift structure to allow access to the second connector located in the internal volume thereof.

The high lift body may be a slat. The internal volume may be a slat box.

The second connector may have a longitudinal axis oriented perpendicular to the leading edge of the high lift body. Alternatively, the second connector may have a longitudinal axis oriented in the flight direction of the wing.

The first connector may permit translational movement of the elongate track along an axis transverse to the track longitudinal axis. The transverse axis may be perpendicular to the track longitudinal axis.

Both the first connector and the second connector may be elongate connectors and may permit rotation of the elongate track about the longitudinal axis of each elongate connector. The longitudinal axis of the first connector may be oriented perpendicular to the track longitudinal axis.

The longitudinal axis of the second connector may intersect the track longitudinal axis.

The elongate track may comprise an elongate connection portion to which the first and second connectors may be fixedly connected. The elongate connection portion may at least partially be located between the internal volume and the outer skin of the main wing. The elongate connection portion may comprise a longitudinal axis parallel to the longitudinal axis of the second connector.

The longitudinal axis of the second connector may be parallel or obliquely oriented relative to the leading edge of the high lift body.

The first and second connectors may be directly connected to the high lift body. The first and second connectors may be directly mounted to the high lift body. The second connector may be directly connected to the high lift body to permit up and including three rotational degree of freedom (e.g. one, two or three rotational degrees of freedom) and one translational degree of freedom therebetween.

The first and second connector may connect the elongate track to the high lift body via a coupling, and the coupling may permit rotation of up to and including three degrees of freedom (e.g. one, two or three degrees of freedom) of the elongate track. The coupling may permit rotation of up to and including three degrees of freedom about an axis transverse to the leading edge of the wing.

The wing may comprise a sealing arrangement between the aperture in the main wing and the elongate track.

A second aspect relates to a high lift assembly for the wing in line with the previously described aspect. The high lift assembly comprises a high lift body (which may be a slat, but may also be a Krueger flap or droop nose/leading-edge droop flap) comprising a high lift structure defining an internal volume.

The high lift body additionally comprises a connection assembly configurable to extend through an aperture in the outer skin of the fixed leading edge of a main wing of an aircraft to movably connect the high lift body to the main wing, such that the high lift body is movable between a retracted position and at least one extended position. The connection assembly comprises an elongate track and a first and second connector, the elongate track being configured to be mounted to the main wing via a bearing such that the track is moveable along a track longitudinal axis. The first and second connector connect the elongate track to the high lift body at a first end of the elongate track.

According to the second aspect, the high lift body is configurable to the retracted position such that the first connector is located between the internal volume in the high lift body and the outer skin of the main wing, and the second connector is an elongate connector having a longitudinal axis oriented transverse to the leading edge of the high lift body, and is connected to the high lift body so as to permit translational movement between the high lift body and the connector along the longitudinal axis thereof. The high lift structure additionally comprises an opening through which the elongate track extends such that the second connector is located in the internal volume of the high lift body.

A third aspect relates to a method for connecting a high lift body to a connection assembly. The method comprises providing a high lift body comprising a high lift structure defining an internal volume therein, locating at least a part of a connection assembly in the internal volume via an opening in the high lift body the connection assembly comprising an elongate track having a track longitudinal axis, connecting the connection assembly to the high lift body via a first connector located external to the internal volume, and an elongate second connector located inside the internal volume so as to permit translational movement between the high lift body and the second connector along a longitudinal axis thereof, and orienting the second connector inside the internal volume such that a longitudinal axis of the second connector is oriented transverse to a leading edge of the wing.

A fourth aspect relates to an aircraft comprising a wing according to the previously described aspects, comprising a high lift assembly according to the previously described aspects.

DETAILED DESCRIPTION

Figure 1:
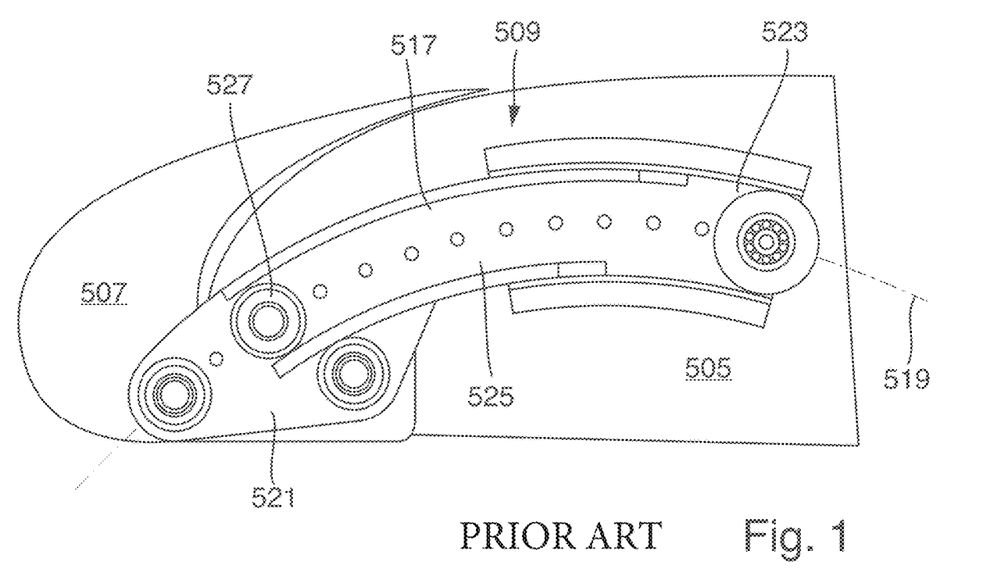
FIG. 1 is an illustration of a main wing and connected high lift body as known in the art.

FIG. 1 shows a connection assembly 509 of a wing for an aircraft according to the prior art, which is configured to connect a slat to the main wing of an aircraft. The connection assembly 509 may be used in combination with a wing comprising a main wing 505, a slat 507, and a connection assembly 509 movably connecting the slat 507 to the main wing 505.

In FIG. 1, the connection assembly 509 comprises a slat track 517 that extends along a track longitudinal axis 519 between a front end 521 and a rear end 523 and has an intermediate portion 525 between the front and rear ends 521, 523. The front end 521 of the slat track 517 is fixedly mounted to the slat 507. The rear end 523 and the intermediate portion 525 of the slat track 517 are movably mounted to the main wing 505 by a roller bearing 527 such that the slat track 517 is movable along the track longitudinal axis 519.

As illustrated, the front end 521 of the slat track 517 is in the form of a knuckle, which comprises the connectors for connecting the slat track 517 to the slat 507. The front end 521, and therefore the knuckle, extends from the slat 507 and into the main wing 505. This means that an aperture, or cut-out, in the main wing is required which is at least as big as the cross-sectional area of the knuckle.

Figure 2A:
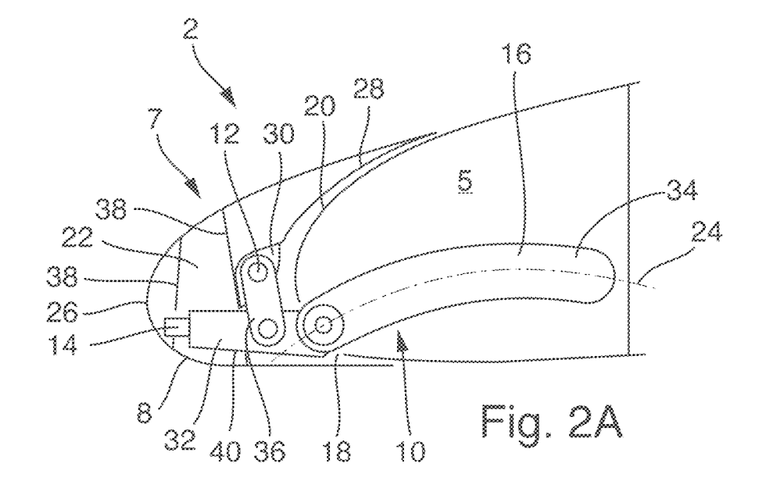
FIGS. 2A and 2B are illustrations of a connection between a main wing and a high lift body according to the present disclosure.

In FIG. 2A, part of a wing 2 of an aircraft is illustrated. The wing 2 comprises a main wing 5 that is connected to a high lift assembly 7 comprising a high lift structure 8 and a connection assembly 10. The connection assembly 10 is connected to the high lift structure 8 via a first and a second connector 12, 14, connected to a first end of an elongate track 16. The elongate track 16 extends through an aperture 18 in an outer skin 20 of the main wing 5 which defines a leading edge thereof, and is mounted to the main wing via a bearing (e.g. a roller bearing) only partially illustrated in FIG. 2 for clarity, although note that an example of a roller bearing may be seen in FIG. 1. Also omitted for clarity is a sealing arrangement which may be present between the elongate track 16 and the aperture 18. The high lift assembly 7 comprises a high lift body, which in this case is a slat, comprising the high lift structure 8, where the high lift structure 8 defines an internal volume 22, and the elongate track is moveable along a track longitudinal axis 24 to permit the high lift body to move between a retracted position and at least one extended position. In FIG. 2A, the high lift body is illustrated in the retracted position.

As is shown in FIG. 2A, the high lift structure 8 comprises a front skin 26 and a rear skin 28 which together define the internal volume 22 in the high lift structure 8. The rear skin 28 additionally is shaped so as to define a recess between the outer skin 20 of the main wing 5 and the internal volume 22. The first connector 12 is located in the recess, and in this example connects to a lug 30 that is connected to (e.g. defined by or mounted on) the rear skin 28 of the high lift structure 8.

The elongate track 16 comprises a curved track portion 34 and an elongate connection portion 32 that extends obliquely relative to the track longitudinal axis 24 at the point of intersection with the curved track portion 34. The second connector 14 is connected to the elongate connection portion 32, and may be fixedly connected thereto. The first connector 12 is also connected to the elongate connection portion 32, in this example via link 36, however it should be noted that other means of connection may be possible, for example a direct connection may be possible.

Here, the first connector 12 is an elongate connector (e.g. in the form of a bolt, rod, or the like) and is connected to the high lift structure 8 such that the longitudinal axis of the first connector 12 is located perpendicular to the track longitudinal axis 24 and/or parallel to the leading edge of the high lift assembly 7. The second connector 14 (which is also an elongate connector) may be described as being oriented substantially perpendicular to the first connector 12 and is supported by the high lift structure 8 in this example, although may be oriented (or considered to be oriented) transverse to the leading edge of the high lift assembly 7 and intersecting the track longitudinal axis 24, perpendicular to the leading edge of the high lift assembly 7, nonparallel to the leading edge of the high lift assembly 7, oriented in the flight direction, oriented transverse to the span direction of the wing, or the like. Here, the high lift structure 8 comprises a number of support spars 38, one of which supports the second connector 14 such that translational movement thereof is permitted. In this example, rotational movement of the second connector 14 about its longitudinal axis may also be permitted. As such, the second connector 14 may simply require to be guided into engagement with the high lift structure 8 (e.g. a spar 38 of the high lift structure).

The rear skin 28 of the high lift structure 8 comprises an aperture 40 therein, which permits the elongate connection portion 32 of the elongate track 16 to extend therethrough, such that the second connector 14 may engage with the high lift structure 8, in this example with a spar 38 of the high lift structure. In orienting the second connector 14 as illustrated in FIG. 2A and simply supporting the second connector 14 on the high lift structure 8, the second connector, and at least part of the elongate connection portion 32 of the elongate track 16 may be able to be guided through a relatively small aperture in the rear skin 28 without requiring any further access apertures (e.g. in the front skin 26) to establish a connection therewith. As such, the structural integrity of the high lift structure 8 is not weakened unnecessarily by the aperture 40, and the smaller aperture may permit ingress of less water, dirt, and the like.

Similarly, as can be seen in FIG. 2A, the aperture in the outer skin 20 of the main wing 5 need only be large enough to permit passage of the curved track portion 34 of the elongate track 16 therethrough, while both the first and second connectors 12, 14 are located outside of the main wing 5, both in the retracted and extended position(s). Having a smaller aperture in the outer skin 20 of the main wing 5 reduces the ingress of water and dirt therein, as well as the noise produced by the main wing in flight. Further, the structural integrity of the main wing is less affected by the smaller aperture therein.

Figure 2B:
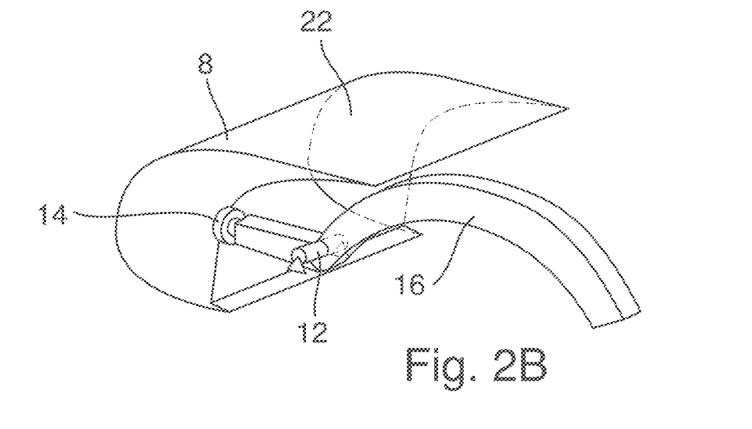

FIG. 2B is a representation of the high lift structure 8 and elongate track 16 of FIG. 2A in 3D. Here, the first and second connectors 12, 14 are illustrated schematically.

In this example, the link 36 that connects the first connector 12 to the elongate connection portion 32 is omitted, and the first connector 12 is simply illustrated as an elongate connector permitting one translational and one rotational degree of freedom. The first connector 12 permits the elongate track 16 at the point to which it is connected translational movement along the longitudinal axis thereof, as well as rotational movement about the longitudinal axis thereof.

In this example, the second connector 14 permits translational movement along the longitudinal axis thereof, as well as rotational movement about the longitudinal axis thereof. In FIG. 2B, it can also be seen that the second connector is located inside the internal volume 22 of the high lift structure 8. It will also be understood by the skilled reader that the second connector 14 may define, or be engaged with, a spherical bearing so as to permit further rotational degrees of freedom (e.g. three rotational degrees of freedom), for example about a vertically extending axis and about an axis extending in the spanwise direction. The spherical bearing is illustrated in FIG. 2B as a bearing seat into which the second connector 14 may be inserted, where the bearing seat may be connected to the high lift structure 8 (e.g. the slat). The skilled reader will also understand that the spherical bearing functions to prevent impermissibly high force/stress concentrations occurring at the region of engagement between the connector 14 and the high lift structure 8 due to bending of the wing and/or the high lift structure 8 during flight.

The skilled reader will also appreciate that such spherical bearings, although not illustrated in detail, may be present at the point of contact between both the first and second bearing 12, 14 and the point of connection with the high lift structure 8 in the described examples, so as to prevent impermissible force/stress concentrations.

Figure 3A:
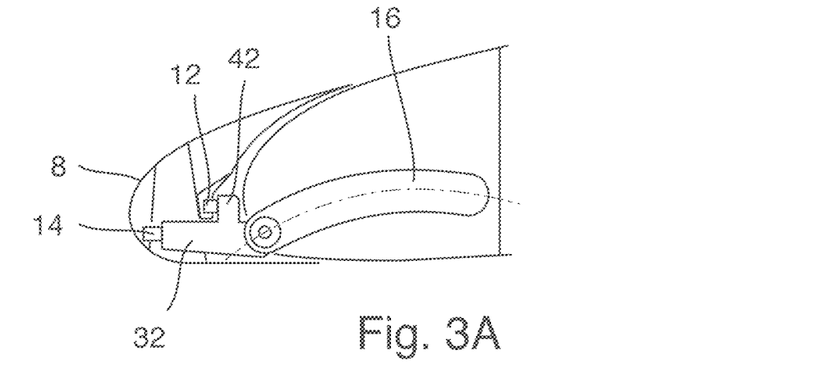
FIGS. 3A to 3C illustrate further examples of a connection according to the present disclosure.
Figure 3B:
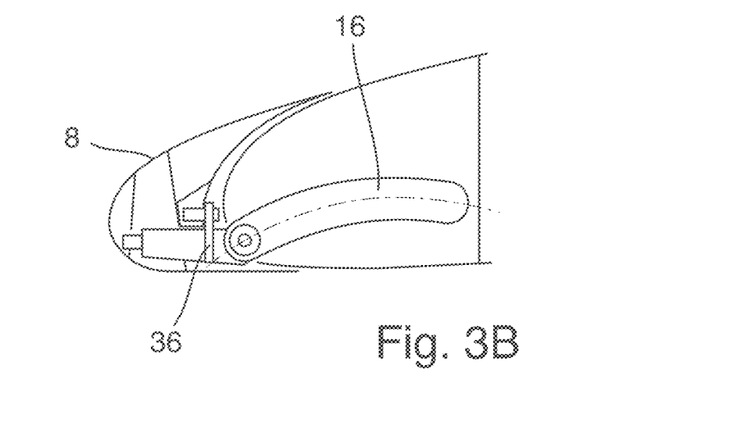
Figure 3C:
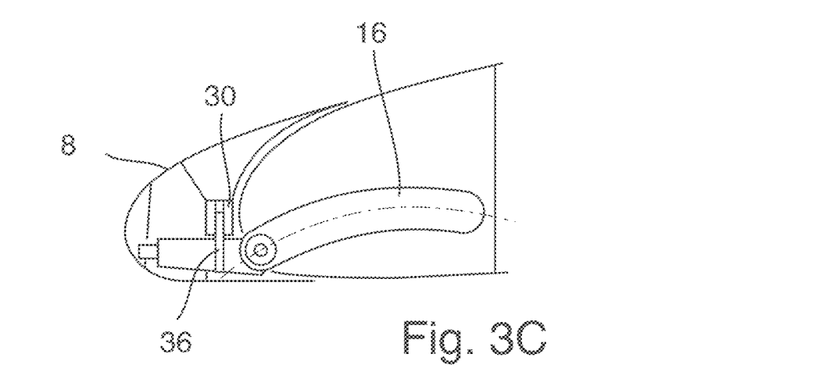

FIGS. 3A-3C illustrate various alternative connection arrangements between the high lift structure 8 and the elongate track 16, in which the first connector 12 may be oriented parallel (e.g. substantially parallel) to the second connector 14. In each of FIGS. 3A to 3C, the second connector 14 is identically connected to the high lift structure 8, and therefore for the sake of brevity, this connection will not be described again.

FIG. 3A illustrates an example in which the elongate connection portion 32 comprises a protrusion 42 to which the first connector 12 is connected. Similar to the example of FIGS. 2A and 2B, the first connector 12 may permit two degrees of freedom of the high lift structure 8 relative to the elongate track 16: translational movement along the longitudinal axis thereof, and rotational movement about the longitudinal axis thereof. As described in relation to FIG. 2B, a spherical bearing may be present at the interface between the first connector 12 and the high lift structure 8 to provide an additional two rotational degrees of freedom. The example of FIG. 3A may be preferable in some instances where it is desired that translational movement is desired at both the first and second connectors 12, 14 in the same direction. Similar to the example of FIG. 2A, the first connector is connected to the high lift structure 8 via a lug, which may provide some limitation to the translational movement of the high lift structure 8 relative to the elongate track 16, for example to prevent disengagement therebetween.

FIG. 3B illustrates a similar configuration, but rather than the elongate connection portion 32 comprising a protrusion, it comprises a link 36, similar to that of FIG. 2A, but rotated e.g. by 90 degrees. As is the case with FIGS. 2A and 3A, the first connector 12 is connected to the high lift structure 8 via a lug. The first connector 12 of FIGS. 2A and 2B permits the same degrees of freedom as the first connector of FIG. 3A.

Alternatively the first connector 12 of FIG. 3B may be fixed rigidly to the high lift body structure 8 such that the link 36 interfaces both the first connector 12 and the elongate track 16 via a spherical bearing.

FIG. 3C similarly illustrates the first connector 12 being connected to the elongate track 16 via a link 36. However, in this example the lug 30 has a forked configuration which connects to the first connector 12 at either end thereof, thus restricting the translational movement of the high lift structure 8 relative to the elongate track 16. The example of FIG. 3C may permit the same degrees of freedom as described in relation to FIGS. 3A and 3B.

Figure 4A:
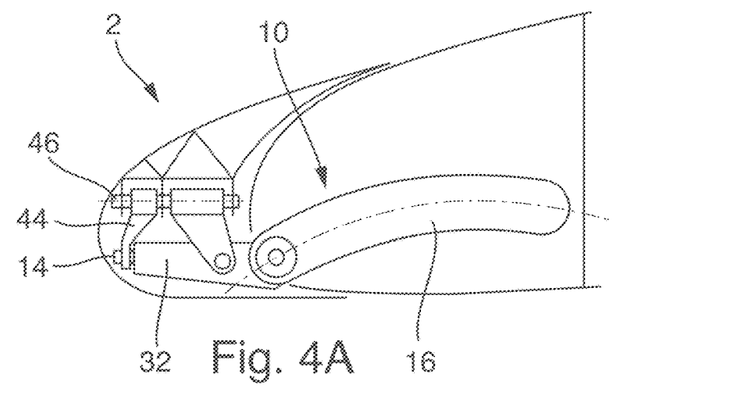
FIGS. 4A to 4C illustrate a "slave" connection to the high lift body comprising an additional coupling.
Figure 4B:
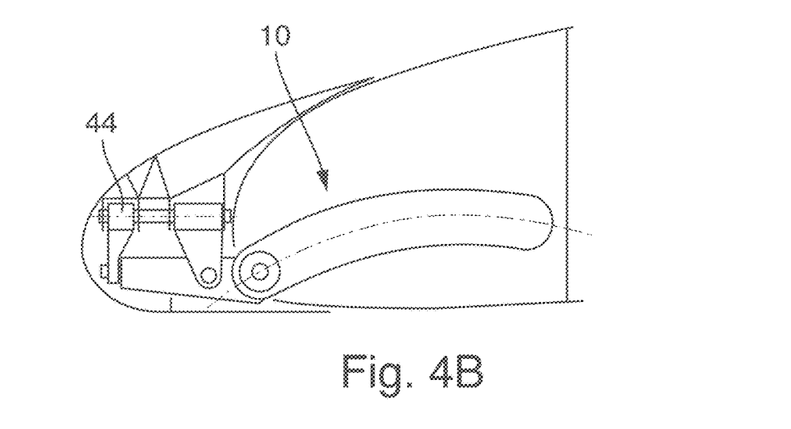
Figure 4C:
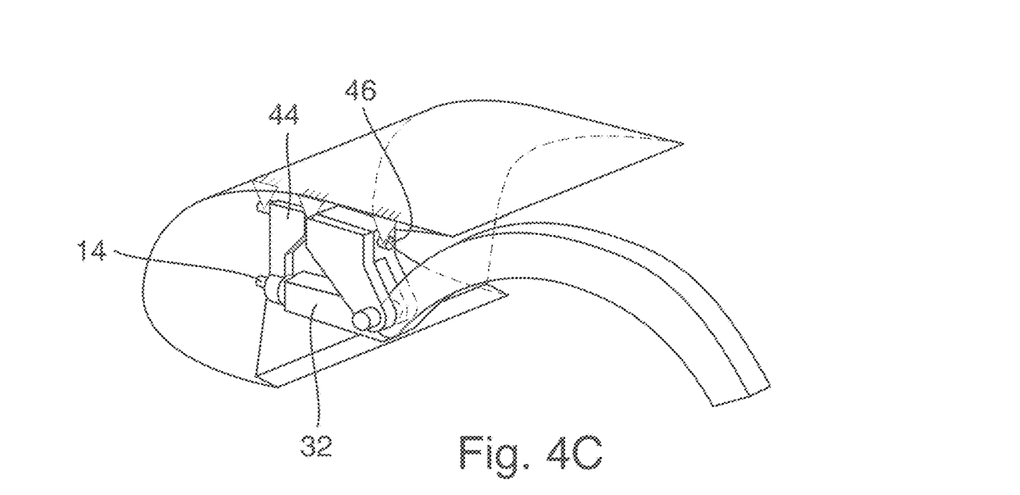

FIGS. 4A-4C illustrate an example of a wing 2 comprising a high lift assembly 7 having a connection assembly 10 and high lift structure 8, where the connection assembly 10 is connected to the high lift structure 8 via a coupling 44. The coupling 44 comprises at least one linkage that connects the elongate connection portion 32 of the elongate track 16 to a coupling connector 46 which is an elongate connector. Here, the coupling 44 comprises two linkages, one that connects to the second connector 14 and one that connects to the elongate connection portion 32 and/or the first connector 12. As can be seen, the coupling 44 comprises at least one sleeve (e.g. one or two sleeves) that connect to the coupling connector 46. The coupling connector 46 may be oriented parallel to the second connector 14, or oblique to the second connector 14, for example such that the longitudinal axes of the second connector 14 and the coupling connector 46 intersect. The coupling connector 46 may be oriented transverse to the leading edge of the high lift body, as is the case with the second connector 14. The coupling connector 46 may be oriented nonparallel to the leading edge of the high lift body, perpendicular to the leading edge of the high lift body, or the like. The coupling connector 46 may be considered to have the longitudinal axis thereof oriented in the flight direction relative to the wing 2, or transverse the span direction of the wing 2. The orientation of the coupling connector 46 may facilitate the positioning of the elongate connector in the internal volume 22.

Owing to the sleeve form of the coupling 44, the coupling 44 permits rotation of the connected elongate connection portion 32 about the longitudinal axis of the coupling connector 46. Further, the coupling 44 may permit translational movement of the elongate connection portion 32 along the longitudinal axis of the coupling connector 46, e.g. parallel to the longitudinal axis of the coupling connector 46, resulting from the offset between the coupling connector 46 and the elongate connection portion 32 due to the length of the coupling 44.

In addition, it can be seen in FIGS. 4A and 4B that the first connector 12 has been integrated into the coupling 44 in that the link 36 to which the first connector 12 is connected in e.g. FIG. 2A now takes the form of the coupling 44, and the first connector is now integrated into the coupling connector 46. In FIG. 4C, the 3D schematic view illustrates that the coupling 44 provides both rotational and translational movement about the axis of the coupling connector 46, while the degrees of freedom provided by the first and second connectors, e.g. in FIG. 2B are also still present.

Having a coupling 44 therefore permits additional degrees of freedom when attaching the high lift structure 8 to the main wing 5, and permits movement of the high lift body relative to the main wing 5. This may be useful to prevent the attachment between the high lift structure 8 and the main wing 5 becoming over-constrained, thus leading to unnecessary and unwanted forces acting in the high lift structure 8 and/or the main wing 5. In some examples, there may be multiple connection assemblies 10 connecting a high lift structure 8 to the main wing 5. It may be desirable to have one connection assembly 10 in which the elongate connection portion 32 is directly connected to the high lift structure 8 as shown in FIGS. 2A & 2B and 3A-3C-a so-called "master" connection, and have the remainder of the connection assemblies 10 having an elongate connection portion 32 that is connected to the high lift structure 8 via a coupling 44, such as in FIGS. 4A to 4C-a so-called "slave" connection. As such, over-constraining the connection between the connection assembly 10 and the high lift structure 8 may be avoided.

Figure 5:
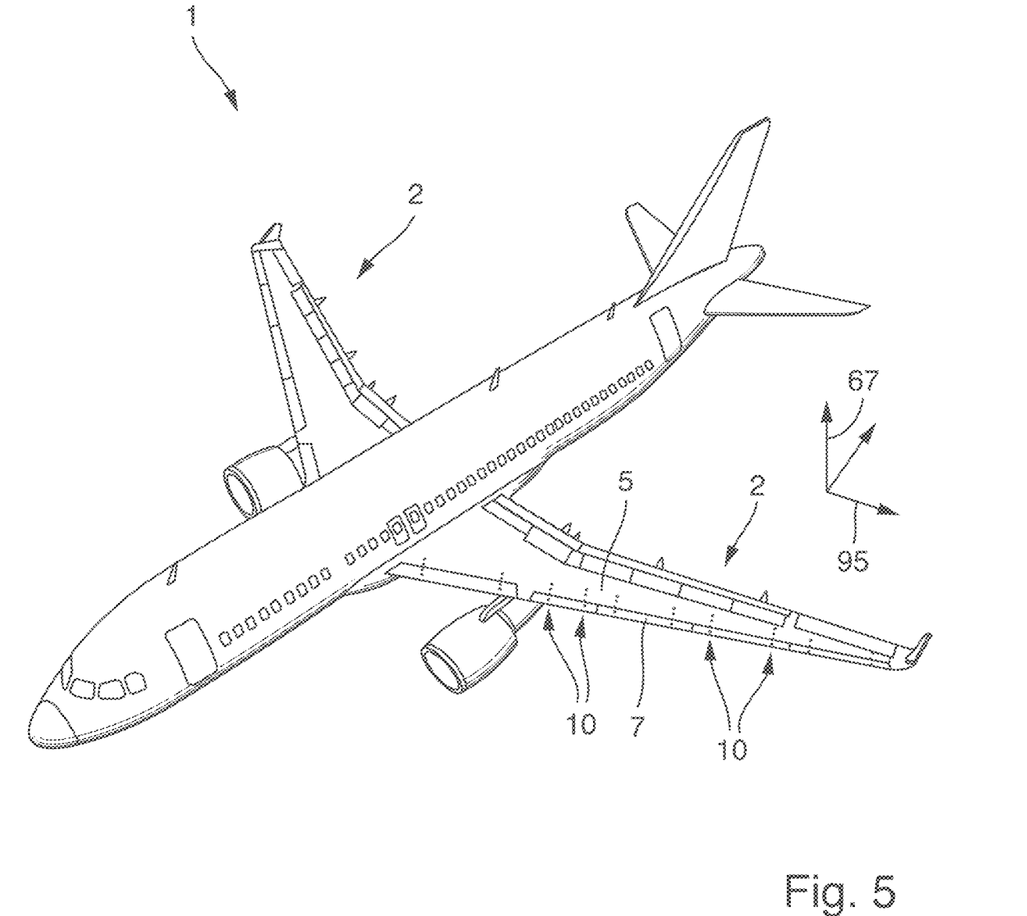
FIG. 5 illustrates an aircraft comprising a wing.

In FIG. 5 an aircraft 1 according to an embodiment of the present invention is illustrated. The aircraft 1 comprises a wing 2 that is formed according to an embodiment of the present invention.

As shown in FIG. 5, the connection assembly 10 is illustrated as a first connection assembly, and the wing 5 comprises a second connection assembly connecting a slat 7 to a main wing 5 in a position spaced apart from the first connection assembly in a wing span direction 95, and wherein the second connection assembly may be formed with a "master" connection to the slat 7, while the first connection assembly may be formed with a "slave" connection, as described above. Additionally illustrated in FIG. 5 is a wing thickness direction 67. While, in FIG. 5, the connection assembly 10 is illustrated as connecting slat 7 to the main wing 5, it should also be understood that the connection assembly 10 may be used to connect a trailing edge flap 2 to the wing 5 of an aircraft.

The invention may be embodied as a wing 2 for an aircraft, as well as a high lift assembly 7 for the wing 2 and a method for connecting a high lift body to a connection assembly 10. The wing 2 for an aircraft, comprises a main wing 5 comprising a fixed leading edge having an outer skin 20, and a high lift assembly 7. The high lift assembly 7 comprises a high lift body comprising a high lift structure 8 defining an internal volume 22 and a connection assembly 10 extending through an aperture 18 in the outer skin 20 of the fixed leading edge of the main wing 5 to movably connect the high lift body to the main wing 5, such that the high lift body is movable between a retracted position and at least one extended position. The connection assembly 10 comprises an elongate track 16 and a first and second connector 12, 14, the elongate track 16 being mounted to the main wing 5 via a bearing such that the track 16 is moveable along a track longitudinal axis 24, and the first and second connectors 12, 14 connecting the elongate track 16 to the high lift body at a first end of the elongate track 16. In addition, the high lift body is configurable to the retracted position such that the first connector 12 is located between the internal volume 22 in the high lift body and the outer skin 20 of the main wing 5. The second connector 14 is an elongate connector having a longitudinal axis oriented transverse to the leading edge of the high lift body, and is connected to the high lift body so as to permit translational movement between the high lift body and the connector 14 along the longitudinal axis thereof, and the high lift structure 8 comprises an opening 40 through which the elongate track 16 extends such that the second connector 14 is located in the internal volume 22 of the high lift body.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft including a main wing comprising a fixed leading edge having an outer skin, and a high lift assembly, the high lift assembly comprising
   a high lift body including a high lift structure defining an internal volume, and
   a connection assembly extending through an aperture in the outer skin of the fixed leading edge of the main wing to movably connect the high lift body to the main wing, such that the high lift body is movable between a retracted position and at least one extended position relative to the fixed leading edge;
   wherein the connection assembly includes an elongate track, a first connector and a second connector, the elongate track is mounted to the main wing via a bearing such that the track is moveable along a track longitudinal axis, and the first connector and the second connector connect the elongate track to the high lift body at a first end of the elongate track;
   wherein while the high lift body is in the retracted position, the first connector is between the internal volume in the high lift body and the outer skin of the main wing,
   wherein the second connector is an elongate connector with a longitudinal axis oriented transverse to a leading edge of the high lift body, and is connected to the high lift body to permit translational movement between the high lift body and the second connector along the longitudinal axis thereof,
   wherein the high lift structure comprises an opening through which the elongate track extends such that the second connector is in the internal volume of the high lift body, and
   wherein the first connector and the second connector remain connected to the high lift body while the high lift body is in the retracted position, in the at least one extended position and moving between the retracted position and the at least one extended position.

2. The wing for an aircraft according to claim 1, wherein the high lift body is a slat and the internal volume is a slat box.

3. The wing for an aircraft according to claim 1, wherein the longitudinal axis of the second connector is perpendicular to the leading edge of the high lift body.

4. The wing for an aircraft according to claim 1, wherein the first connector is configured to permit translational movement of the elongate track along an axis transverse to the track longitudinal axis.

5. The wing for an aircraft according to claim 1, wherein the first connector and the second connector are elongate connectors and permit rotation of the elongate track about the longitudinal axis of each of the elongate connectors.

6. The wing for an aircraft according to claim 1, wherein the longitudinal axis of the second connector intersects the track longitudinal axis.

7. The wing for an aircraft according to claim 1, wherein the elongate track comprises:
   an elongate connection portion fixedly connected to each of the first connector and the second connector,
   wherein the elongate connection portion is at least partially between the internal volume and the outer skin of the main wing, and
   wherein the elongate connection portion comprises a longitudinal axis parallel to the longitudinal axis of the second connector.

8. The wing for an aircraft according to claim 1, wherein the longitudinal axis of the second connector is obliquely oriented relative to the leading edge of the high lift body.

9. The wing for an aircraft according to claim 1, wherein the first connector and the second connector are directly connected to the high lift body.

10. The wing for an aircraft according to claim 9, wherein the second connector is directly connected to the high lift body to permit up to and including three rotational degrees of freedom and one translational degree of freedom therebetween.

11. The wing for an aircraft according to claim 1, wherein the first connector and the second connector connect the elongate track to the high lift body via a coupling, the coupling configured to permit rotation of up to and including three degrees of freedom of the elongate track about an axis transverse to the leading edge of the wing.

12. The wing for an aircraft according to claim 1, further comprising a sealing arrangement between the aperture in the main wing and the elongate track.

13. A high lift assembly comprising:
a high lift body including a high lift structure defining an internal volume of the high lift body;
a connection assembly configurable to extend through an aperture in an outer skin of a fixed leading edge of a main wing of an aircraft to movably connect the high lift body to the main wing, wherein the high lift body is movable relative to the fixed leading edge between a retracted position and at least one extended position,
wherein the connection assembly includes an elongate track, a first connector and a second connector,
wherein the elongate track is configured to be mounted to the main wing via a bearing such that the track is moveable along a track longitudinal axis,
wherein the first connector and the second connector connect the elongate track to the high lift body at a first end of the elongate track;
wherein, while the high lift body is in the retracted position, the first connector is between the internal volume in the high lift body and the outer skin of the main wing,
wherein the second connector is an elongate connector having a longitudinal axis oriented transverse to the leading edge of the high lift body, and is connected to the high lift body to permit translational movement between the high lift body and the second connector along the longitudinal axis thereof,
wherein the high lift structure comprises an opening through which the elongate track extends such that the second connector is located in the internal volume of the high lift body, and
wherein the first connector and the second connector remain connected to the high lift body while the high lift body is in the retracted position, in the at least one extended position and moving between the retracted position and the at least one extended position.

14. A method for connecting a high lift body to a connection assembly comprising:
providing a high lift body comprising a high lift structure defining an internal volume in the high lift body;
locating at least a part of a connection assembly in the internal volume via an opening in the high lift body, wherein the connection assembly includes an elongate track with a track longitudinal axis;
connecting the connection assembly to the high lift body via a first connector external to the internal volume and an elongate second connector in the internal volume to permit translational movement between the high lift body and the second connector along a longitudinal axis thereof; and
orienting the second connector in the internal volume such that a longitudinal axis of the second connector is oriented transverse to a leading edge of the wing,
wherein the first connector and the second connector remain connected to the high lift body while the high lift body is in a retracted position, at least one extended position and moving between the retracted position and the at least one extended position.

15. An aircraft comprising the wing according to claim 1.

16. The wing for the aircraft according to claim 1, wherein the second connector is oriented along a direction perpendicular to an orientation of the first connector.

17. The wing for the aircraft according to claim 1, wherein the first connector is pivotably linked to the first end region of the elongate track and the second connector is fixed to the first end region.

18. The wing for the aircraft according to claim 1, wherein the first connector is directed connected to the high lift body at an elevation on the high lift body higher than where the second connector is directly connected to the high lift body.

* * * * *